Figure 1:
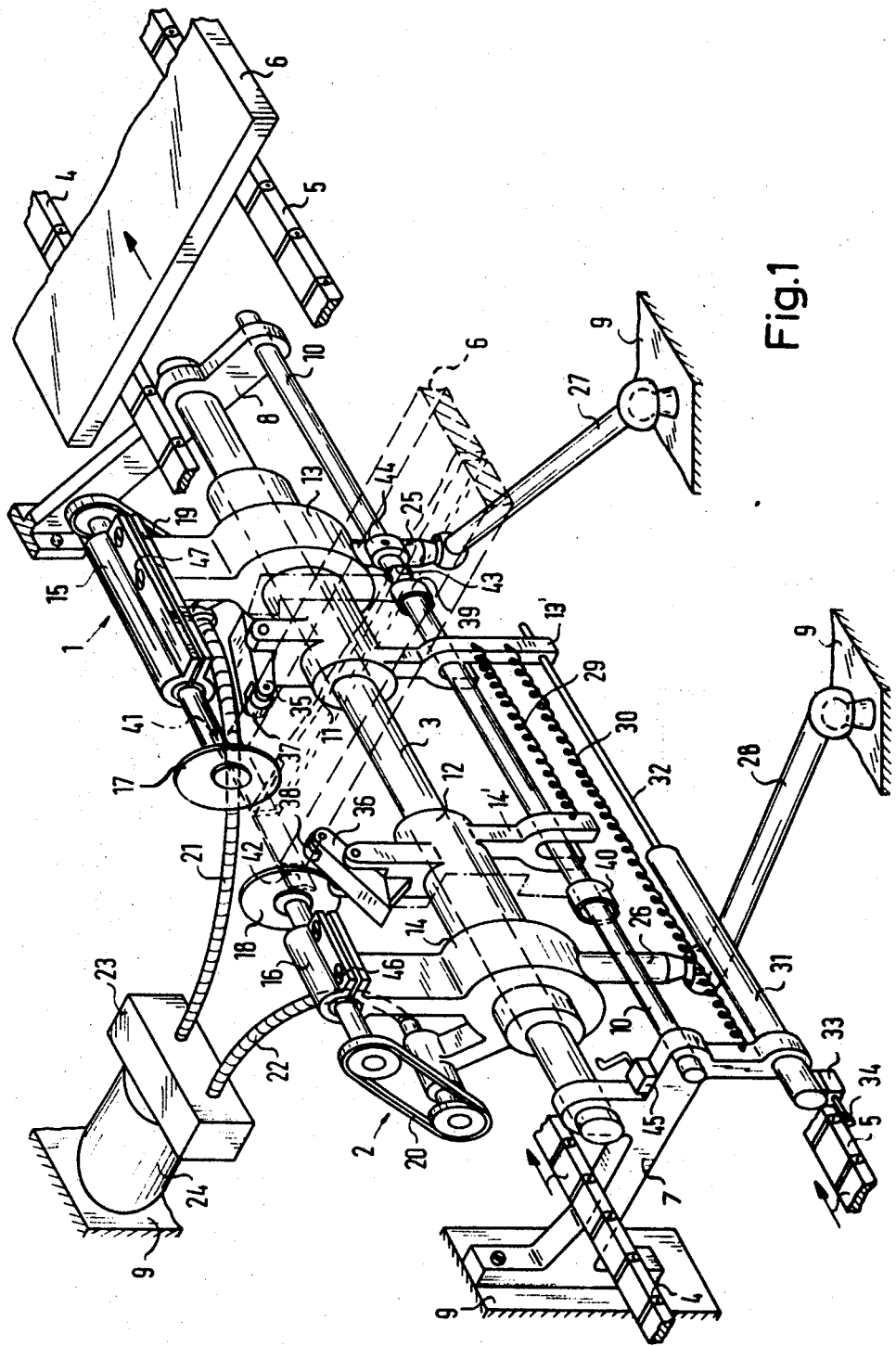

United States Patent

[11] 3,608,594

| [72] | Inventor | Josef Holderried<br>Freiburg/Breisgau, Germany |
|---|---|---|
| [21] | Appl. No. | 875,217 |
| [22] | Filed | Nov. 7, 1969 |
| [45] | Patented | Sept. 28, 1971 |
| [73] | Assignee | B. Raimann GmbH<br>Freiburg/Breisgau, Germany |
| [32] | Priority | Apr. 15, 1969 |
| [33] | | Germany |
| [31] | | P 19 19 102.7 |

[54] CUTTING OR TRIMMING DEVICE FOR VENEERED WORKPIECES
15 Claims, 5 Drawing Figs.

[52] U.S. Cl. .................................................. 143/47 G,
83/293, 83/314, 83/318
[51] Int. Cl. ..................................................... B27b 5/04,
B27b 5/18
[50] Field of Search............................................ 143/47 (7),
47, 4, 6; 83/293, 314, 318, 319, 320; 144/134

[56] References Cited
UNITED STATES PATENTS
2,605,841  8/1952  Overman ....................... 83/318
2,812,787  11/1957  Bibby ............................ 143/47 G
3,199,554  8/1965  Thedick ........................ 143/47 G

*Primary Examiner*—Donald R. Schran
*Attorney*—Waters, Roditi, Schwartz & Nissen ABSTRACT: A device for trimming projecting pieces of veneer on veneered workpieces comprises two saw units which are arranged to be displaced in the same direction as the workpieces and have abutments for engaging, respectively, the leading and trailing edges of the workpieces. The workpiece firstly pushes down an abutment on one of the saw units actuating a brake so that this saw unit is locked and the workpiece pushes the other of the saw units along a certain distance during which actuation of a saw automatically occurs to trim off veneer from the front of the workpiece. At the end of this travel the abutment on the entrained saw unit is allowed to be swung downwards by the workpiece so that a brake is actuated. The further movement causes the trailing edge to clear the abutment on the first-mentioned saw unit which can then rock upwards releasing the brake so that the first-mentioned saw unit is drawn along behind the workpiece and its saw cuts off veneer projecting from the rear of the workpiece.

CUTTING OR TRIMMING DEVICE FOR VENEERED WORKPIECES

The present invention relates to cutting or trimming devices for veneered workpieces. Such devices are used more particularly on veneer-gluing equipment. Known forms of trimming device can comprise, for instance, a motor driven sawing assembly with abutments aligned with the lines along which it is adapted to cut. The two abutments come into engagement with the leading and trailing edges of the workpiece which is moved along a straight line.

Such known trimming devices can be fitted, for instance, on veneer-gluing machines in order to cut off the pieces of veneer extending to the front and to the rear of the workpiece so that the workpieces are ready for fabrication.

Since the workpieces leave the gluing machine on conveyor belts, conveyor chains, or conveying rollers at a constant rate in accordance with the speed of operation of the machine, trimming machines have been developed which trim off projecting pieces of veneer without arresting movement of the workpieces.

Such known types of trimming devices may comprise a sawing assembly with an abutment which engages the front leading edge of the workpiece. The sawing assembly is mounted on a parallelogram linkage together with its electric motor on whose shaft two circular saw plates are mounted. Displacement of the workpiece causes the sawing assembly to be moved downwards. The abutment, which is in the form of a rail perpendicular to the direction of movement of the workpiece with precisely parallel front and rear abutment faces, is laterally offset approximately at the height of the shaft of the electric motor with the two circular saw blades. The abutment is rigidly connected with the housing of the electric motor. The two circular saw blades are spaced apart by means of distance pieces so that the side of the circular saw blade which is next to the motor is aligned with the front abutment face of the abutment and the side of the other circular saw blade facing the end of the shaft of the motor is aligned with the rear abutment face of the abutment. Thus, the distance between the facing sides of the adjacent saw blades precisely correspond with the breadth of the abutment.

This arrangement enables a piece of veneer extending from the edge of the workpiece in the direction of movement to be sawn off precisely and flush with the front workpiece edge by the circular saw blade when the front edge of the workpiece abuts against the front face of the abutment and a piece of veneer projecting in the direction of movement to the rear is cut off flush with the rear edge of the workpiece when the rear edge of the workpiece lies against the rear face of the abutment.

However, trimming devices of the above-mentioned type have the disadvantage that they make necessary the use of pneumatic or hydraulic devices, such as air or oil driven rams, valves, ducts, and pumps and are therefore relatively complicated from an engineering point of view and represent a high capital investment. Furthermore the adjustment of the two saw blades at the correct spacing is difficult and requires much time. Special spacing washers or discs are required. These washers must have ground faces in order to afford an accurate setting.

The parallelogram guide linkage for the sawing assembly also makes necessary the use of counterweights so that the overall weight is increased, as is also the space required by such linkages with their associated hydraulic or pneumatic control equipment.

One object of the invention is to provide a trimming device which makes possible satisfactory operation without the use of complicated and expensive pneumatic or hydraulic equipment.

A still further object of the invention is to provide a trimming device which can be readily adjusted to align the cutting faces of the saw blades with the abutment faces.

The present invention accordingly consists in a device for trimming off pieces of projecting veneer from veneered workpieces, comprising motor drive means, a sawing assembly, two abutments aligned with the direction of cut of the saw assembly and arranged to come sequentially into engagement with leading and trailing edges on the workpiece, characterized in that the device comprises first and second sawing units comprised in the sawing assembly, the first sawing unit being arranged to be pushed by the workpiece during travel of the workpiece along a path; an energy storing means connecting the two sawing units and arranged to store energy during movement of the first sawing unit away from the second storing unit; brakes for braking the sawing units, the brakes being arranged to be actuated by the abutments, which are mounted on the sawing units; means for causing transverse movement of the sawing units when they are moved in the direction of travel of the workpiece; and a second energy storing means for drawing both sawing units back into an initial starting position in a direction opposite to the direction of travel of the workpiece.

The brakes for braking the sawing units can be, for instance, mechanical friction brakes, mechanical positive locking devices, or electrical braking devices.

With a construction in accordance with the invention the mechanical arrangement is simpler, cheaper and more reliable than prior art devices with hydraulic control means. Apart from the drive motor for the sawing units no power is required in addition to the pushing force of the conveying means. The saws are pressed against the workpiece so that there is no tendency to detach the edging veneer which is to be trimmed.

In accordance with a preferred feature the abutments are in the form of rocking abutments adapted to be rocked under the workpiece for passage of the workpiece over the abutment. The rocking movement of the abutments can be arranged to operate friction brakes to lock movement of the respective sawing unit. The abutments can be arranged to be rocked downwards into a position below the workpiece by the weight of the workpiece and at least one of the abutments can be arranged to be caused to rock by a stationary abutment. As a result not only is the speed of movement of the saw units and thus of the transverse movement of the saw units dependent on the workpiece, but also the point of time at which the saw unit entrained ceases its travel.

In accordance with a further preferred feature of the invention the arrangement can comprise links pivotally connected with the sawing units and arranged to tilt the sawing units so that each sawing unit moved in the direction of travel of a workpiece performs a circular movement in a vertical plane parallel to the direction of movement of the workpiece, and also in a horizontal plane.

A tension spring can be used to connect the two saw units to cause the one to follow the other.

Alternatively, in order to bring about transverse movements of the sawing units, it is possible to use a ramp.

There now follows a description of an embodiment of the invention, making reference to the accompanying drawings, so as to make details and further features clear.

FIG. 1 is a diagrammatic perspective view of a cutting or trimming device with two saw units which operate separately.

FIGS. 2, 3, 4, and 5 schematically show the manner of operation of the abutments associated with the two saw units during a working cycle.

The embodiment of a cutting or trimming machine shown diagrammatically in FIG. 1 comprises two saw or sawing units 1 and 2 which are mounted on a guide rod or shaft 3. The rod 3 is at the somewhat lower level than the transport plane of two parallel conveyor chains 4 and 5 which are provided on their upper surfaces with holding devices for propelling a workpiece 6. These holding devices are not shown in order to simplify the drawing. The guide rod 3 is exactly parallel to the chains 4 and 5 and has its ends carried in brackets 7 and 8 which for their part are fixed to a stationary machine part 9. The two brackets 7 and 8 besides holding the ends of the guide rod or shaft 3 also hold the ends of a further guide rod or shaft 10 which has a smaller diameter than the rod or shaft 3.

The saw units 1 and 2 arranged on the guide shaft 3 comprise abutment carriers 11 and 12 which can be slid on the guide rod 3 in the direction of its axis and carry projecting forks 13' and 14' rigidly. These forks 13' and 14' envelope the smaller guide rod 10 and thus prevent a twisting of the respective abutment carrier 11 or 12, as the case may be, about the guide rod 3.

The abutment carriers 11 and 12 include tool carriers 13 and 14 which are mounted on the rod 3 so that they can rock about its axis but cannot move axially in relation to the respective carriers 12 and 13. The carriers 12 and 13 are provided with arms 15 and 16 which at their upper ends carry bearings for circular saw blades 17 and 18. The circular saw blades 17 and 18 are connected by a belt drive 19 and 20 with flexible shafts 21 and 22 whose other ends are connected by means of a suitable drive 23 with a stationary motor 24 operating on normal line frequency, that is to say 50 cycles per second.

In previously proposed constructions each tool carrier 13 and 14 was provided with a high-frequency motor whose shaft had the circular saw blade mounted on it. One advantage of the construction in accordance with the present invention is that such a costly and weighty arrangement is not required.

The tool carriers 13 and 14 are provided with arms 25 and 26 which extend downwards below the guide rod 3 and have lower ends connected by means of ball and socket joints with links 27 and 28. The two links 27 and 28 are connected at their other ends by means of ball and socket joints with the stationary machine part 9. The links 27 and 28 are approximately perpendicular to the arms 25 and 26. The attachment points of the ends of the links 27 and 28 on the stationary machine part 9 is so selected that the circular saw blades 17 and 18 carry out circular cutting movements about the axis of the guide rod when the two saw units 1 and 2 are moved out of the abutment position nearest to the bracket 7 towards the bracket 8, that is to say from the left to the right. The circular saw blades 17 and 18 thus perform circular movements both in a vertical plane of movement perpendicular to the rod 3 and also in their horizontal plane of movement.

The only connection between the saw units 1 and 2 which can be freely shifted on the guide rod 3 in the longitudinal direction is constituted by a tension spring 29 whose ends are connected respectively with the fork 14' of the saw unit 2 and the fork 13' of the saw unit 1. Furthermore a second tension spring 30 is connected with the fork 13' while its other end is connected with the bracket 7.

While the tension spring 29 tends to move the saw units 1 and 2 towards each other so that they abut, the tension spring 30 tends to draw both saw units towards the bracket 7. Parallel to tension spring 30 there is a damping cylinder 31 whose one end is connected rigidly with the bracket 7 while its piston is connected by means of a piston rod 32 with the fork 13' of the saw unit 1. The damping cylinder 31 is provided with a throttle or choke valve 33 which is controlled by means of a setting screw 34 in order to regulate the return movement brought about by the tension spring 30.

The abutment carriers 11 and 12 are provided with rocking abutments 35 and 36 lying at substantially the same height as the circular saw blades 17 and 18. The rocking abutments carry rollers 37 and 38. The roller 37 is so arranged on the abutment 35 associated with the saw unit 1 that it can be brought into contact with the leading edge of the workpiece while the roller 38 of the abutment 36 associated with the saw unit 2 can be brought into engagement wit the trailing edge of the workpiece.

The abutments 35 and 36 of the saw units 1 and 2 are also connected directly with brakes 39 and 40 and are arranged to actuate the brakes only when the roller 37 and 38 of the abutments 35 and 36 are at a level lower than the plane defined by the carrying surfaces of the conveyor chains 4 and 5. The brakes 39 and 40 actuated by the abutments 35 and 36 prevent longitudinal movement of the saw units 1 and 2 along the guide rod or shaft 3. In the case of the abutment 36 of the saw unit 2 a spring is provided which urges the abutment 36 against the workpiece so that it can only be pressed against the force of the spring into the position in which longitudinal movement of the saw unit 2 is braked. The same applies for the abutment 35 of the saw unit 1, which can only be tilted into the position in which a braking action takes place when a small spring force is overcome.

The manner of operation of the device in accordance with the invention is now described with reference, more particularly, to FIGS. 2 to 5.

Figure 2:
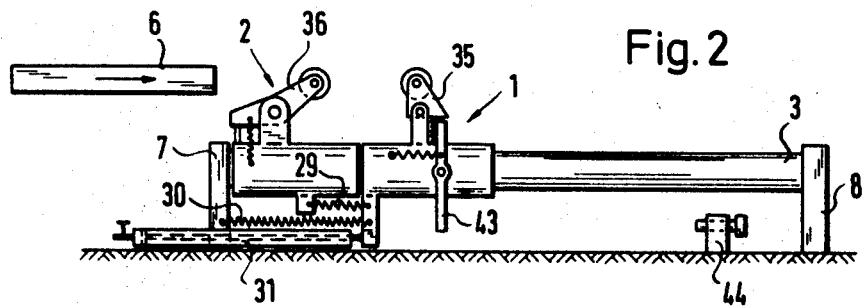
Figure 3:
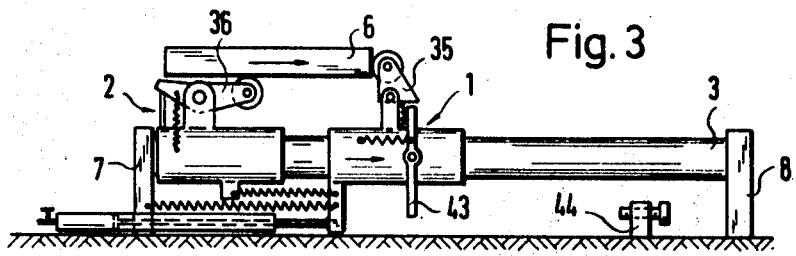
Figure 4:
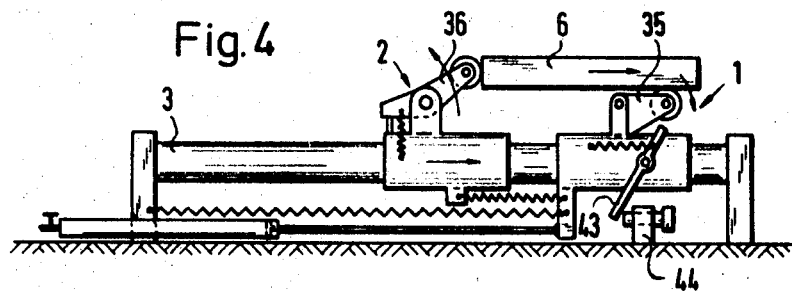

As is shown in FIG. 2 the tension spring 30 holds the saw unit 1 and also the saw unit 2 in a starting position in which movement to the left is limited by abutment against the bracket 7. A workpiece 6 is now moved in the direction of the arrow, that is to say from the left to the right, on the conveyor chains which are not shown in FIGS. 2 to 5, towards the abutment 36 of the saw unit 2. The workpiece 6 presses the abutment 36, as shown in FIG. 3, against the above-mentioned spring force downwards into a position in which the abutment actuates the brake 40 and prevents longitudinal movement of the saw unit 2 on the guide shaft 3. With the saw unit 2 locked in this initial position, the front or leading edge of the workpiece 6 abuts against the abutment 35 of the saw unit 1 and displaces it so that it moves towards the bracket 8. Since, as can be seen from FIG. 1, the cutting surface of the circular saw blade 17 is precisely aligned with the roller 37 of the abutment 35 and on a longitudinal movement of the saw unit 1 this saw blade 17 performs a transverse movement owing to the arrangement of the link 27, the front part 41 of the workpiece is cut off in a manner which is precisely aligned with its front edge. During the course of further longitudinal movement towards the bracket 8 the circular saw blade swings back again and a lever 43 which is rigidly connected with the saw unit 1 runs up against a stationary abutment 44. As is shown in FIG. 4 this lever 43 thus ceases to hold the abutment 35 in its vertical position, the workpiece 6 overruns the abutment, swinging it in a downward direction and thus blocking further movement of the saw unit 1 on the guide rod 3 in the direction of shifting on the guide rod 3.

In the meantime, however, the rear edge of the continuously advancing workpiece 6 has passed the abutment 36 of the saw unit 2 and thus releases the abutment 36 so that it swings out of its tilted position. As a result the brake of the saw unit 2 is released and the abutment 36 is caused to follow the workpiece 6 owing to the tension spring 39 which has been stretched by the displacement of the saw unit 1. During this following movement the abutment 36 rests against the trailing edge of the workpiece 6. Since, however, the longitudinal movement of the saw unit 2 necessarily brings about a transverse movement of the circular saw blade 18 owing to the arrangement of the link 28, the piece of veneer 42 of the workpiece 6 projecting to the rear is severed at the desired position since the abutment face of the roller 38 is aligned with the cutting face of the circular saw blade 18.

The longitudinal movement of the saw unit 2 is ended when the unit comes to rest against the blocked saw unit 1. In this position the spring 29 reaches the limit of contraction.

Figure 5:
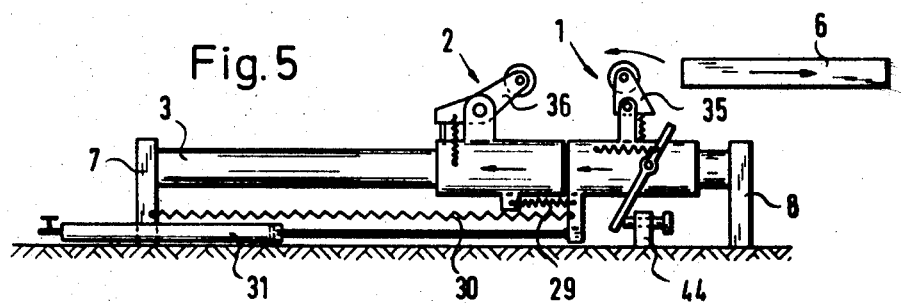

When, as shown in FIG. 5, the continuously advancing workpiece 6 has cleared the abutment 35 of the saw unit 1, the abutment 35 is corrected again by spring force and thus releases the brake of the saw unit 1. The saw unit is now drawn back into the initial position towards the bracket 7 by the tension spring 30 which has been tensioned during the movement in the direction of conveyance. This return movement is delayed by damping cylinder 31 whose damping action can be controlled, as has already been mentioned, by the setting screw 34 of the throttle or choke valve 33.

When the abutment carrier 12 of the saw unit 2 has actuated a terminal switch 45 mounted on the bracket 7, a safety device, which is not shown, causes a further workpiece 6 to be supplied to the cutting or trimming device in accordance with the invention.

One advantage of the device in accordance with the invention is that, as compared with known constructions, the circular saw blades are very simple to adjust. Adjustment to be in alignment with the abutment faces of the abutments can be carried out very rapidly. For this purpose it is only necessary to loosen the screws 46 and 47 so that the whole bearing of the respective circular saw blade can be moved in a longitudinal direction until the cutting face or line of the circular saw blade is precisely aligned wit the abutment 35 or 36 as the case may be. It is therefore not necessary to make use of distance pieces or templates.

I claim:

1. In a device for trimming off pieces of projecting veneer from veneered workpieces, comprising motor drive means, a sawing assembly, two abutments aligned with the direction of cut of the saw assembly and arranged to come sequentially into engagement with leading and trailing edges on the workpiece, an improvement comprising:
   first and second relatively displaceable sawing units comprised in the sawing assembly, the first sawing unit being arranged to be pushed by the workpiece during travel of the workpiece along a path;
   an energy storing means connecting the two sawing units for storing energy during movement of the first sawing unit away from the second sawing unit;
   brakes arranged to be actuated by the abutments on the sawing units for braking the sawing units and permitting sequential travel of the sawing units along said path of travel of the workpiece;
   means for causing transverse movement of the sawing units when they are moved in the direction of travel of the workpiece; and
   a second energy storing means for drawing both sawing units back into an initial starting position in a direction opposite to the direction of travel of the workpiece.

2. The improvement as set forth in claim 1 comprising an elongated guide means which is parallel to the direction of movement of the workpiece, the sawing units being supported to move along the guide means and to swing thereabout.

3. The improvement as set forth in claim 2, in which the sawing units comprise saw blades with cutting faces, defining lines of cut, facing each other, the abutments having abutment faces also facing each other.

4. The improvements set forth in claim 1, in which the abutments are constituted as rocking abutments adapted to be rocked under the workpiece for passage of the workpiece over the abutments.

5. The improvement as set forth in claim 4, in which said brakes are friction brakes positioned to be operated by rocking of the rocking abutments to lock movement of the sawing unit.

6. The improvement as set forth in claim 5, in which the abutments are arranged to be rocked downwards into a position below the workpiece by the weight of the workpiece and at least one of the abutments is arranged to be caused to rock by a stationary abutment.

7. The improvement as set forth in claim 1, in which the brakes are mechanical brakes.

8. The improvement as set forth in claim 1, in which the abutments comprise rollers for abutting against the workpiece.

9. The improvement as set forth in claim 1, wherein said means for causing transverse movement of the sawing units comprises links pivotally connected with the sawing units and arranged to tilt the sawing units so that each sawing unit moved in the direction of travel of a workpiece performs a circular movement in a vertical plane parallel to the direction of movement of the workpiece and also in a horizontal plane.

10. The improvement as set forth in claim 1, wherein said means for causing transverse movement of the sawing unit comprises a ramp for bringing about transverse movements of the sawing units for cutting veneer.

11. The improvement as set forth in claim 1, wherein said second energy storing means is arranged to exert a displacing force on both sawing units in a direction opposite to the direction of travel of the workpieces.

12. The improvement as set forth in claim 1, comprising a damping means engaging one of said sawing units for damping displacement thereof.

13. The improvement as set forth in claim 1, wherein said motor drive means comprises a stationary motor, and flexible shafts for driving the sawing units from the motor.

14. The improvement as set forth in claim 1, wherein said sawing units include circular saw blades, and bearing means for carrying the circular saw blades, said bearing means allowing adjustment of the circular saw blades in a direction parallel to the direction of travel of the workpieces.

15. The improvement as set forth in claim 1, comprising a terminal switch arranged to control the supply of workpieces to the sawing units.